United States Patent [19]

Hansen

[11] 3,877,909

[45] Apr. 15, 1975

[54] INTERNALLY SELF-SUPPORTING FILTER AND PROCESS FOR MAKING SAME

[75] Inventor: Elwood F. Hansen, Allendale, N.J.

[73] Assignee: Drico Industrial Corporation, Wallington, N.J.

[22] Filed: Apr. 23, 1974

[21] Appl. No.: 463,643

[52] U.S. Cl. .................. 55/487; 55/491; 55/514; 55/527; 55/528
[51] Int. Cl. ............................................. B01d 39/16
[58] Field of Search ............ 55/487, 491, 492, 514, 55/524, 527, 528, DIG. 31, 486

[56] References Cited
UNITED STATES PATENTS

| | | | |
|---|---|---|---|
| 1,215,974 | 2/1917 | Orem | 55/495 |
| 3,388,536 | 6/1968 | Nash | 55/492 |
| 3,526,557 | 9/1970 | Taylor, Jr. | 55/487 |
| 3,563,828 | 2/1971 | Marshall | 55/514 |

*Primary Examiner*—Bernard Nozick
*Attorney, Agent, or Firm*—Burgess, Dinklage & Sprung

[57] ABSTRACT

An internally supported, composite frameless filter is disclosed and includes the following:

1. Two or more fluid permeable filter members having substantially the same peripheral shape;

2. A thin, wire-like frame member positioned between the filter members and spaced inwardly from the periphery thereof;

3. The first of the filter members being the upstream filter layer made of a relatively thick, low density, medium or long filament puffed glass fiber layer; the second of the filter members being the downstream filtering layer and being made of a thin, relatively high density, non-woven fibrous layer;

4. An anti-bulge device including localized compression discs centrally positioned on both sides of the composite filter compressively sandwiching the filter members therebetween, the compression discs being rigidly attached to each other through the filter members; and 5. Each of the filter members is adhesively secured to the frame member and is uncompacted throughout its entire thickness, except in the area of the anti-bulge device.

14 Claims, 6 Drawing Figures

PATENTED APR 15 1975 3,877,909

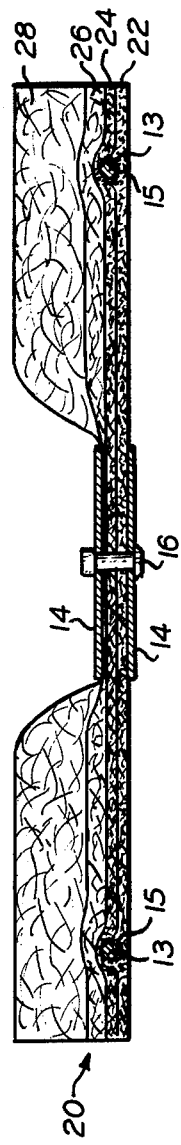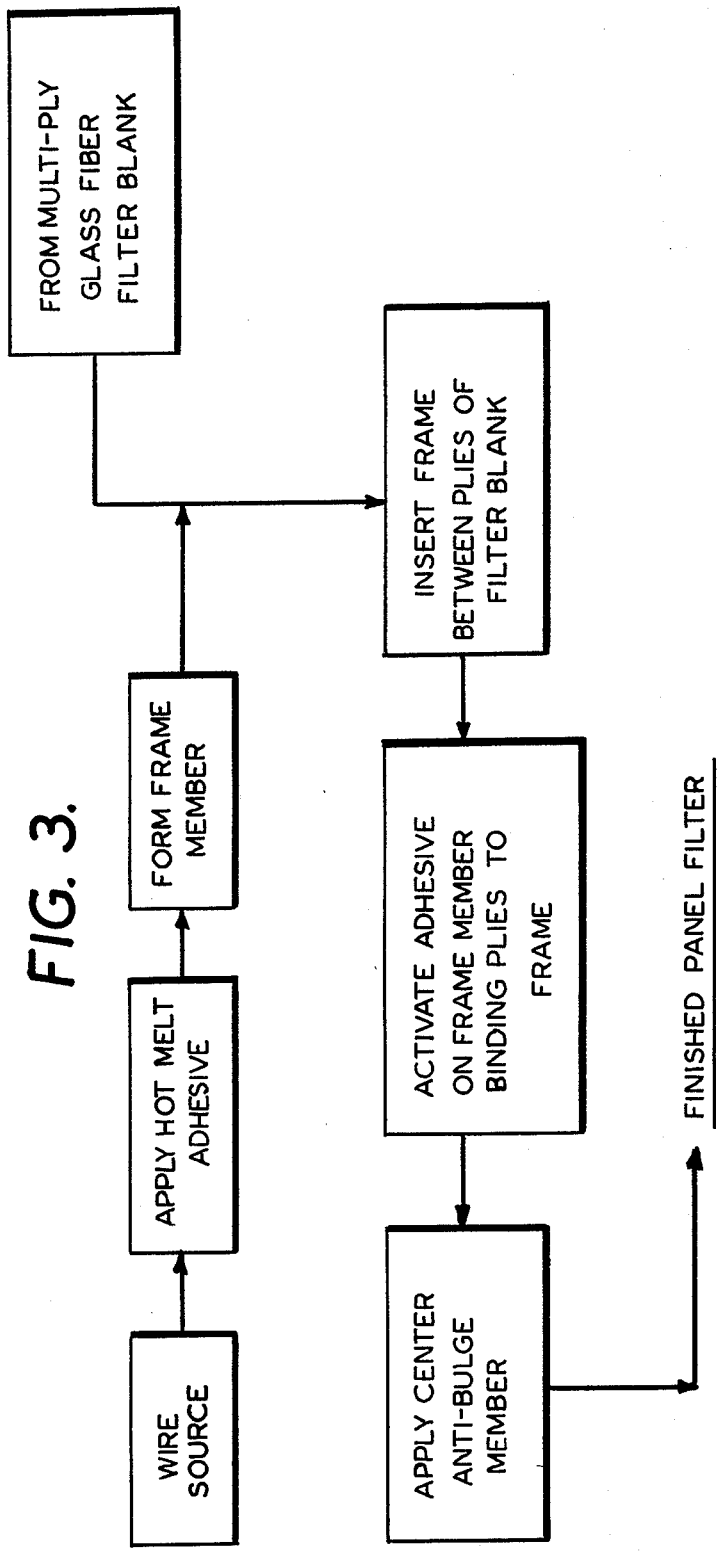

INTERNALLY SELF-SUPPORTING FILTER AND PROCESS FOR MAKING SAME

BACKGROUND OF THE INVENTION

This invention relates to an improved filter device, and, more particularly, to an internally self-supporting filter having two layers of fluid permeable material with an internal support frame.

Most filters presently used in air-conditioning and heating systems and for other purposes are supported by a metal or carboard frame extending about the edges of the filter and overlapping both the front and back panels of the filter. Some of these filters also have expanded metal grids or similar structures (such as bottle cap scrap) on one or both surfaces to support the filter. In some prior art filters, coarse screens have been embedded in the fibrous material for supporting the filter. However, in all of these filters, the support material considerably reduces the effective area of the filter, even up to 20% of the filtering area. Furthermore, when the edge type supported filter is used, particularly in apparata in which filters are butted edge to edge, there results a gap or a space in which contaminated air readily passes.

In. U.S. Pat. Nos. 3,388,535 and 3,388,536, both to Nash, there are described self-supported filters each having two layers of fibrous filter material. Each patent describes a self-supporting structure as containing a self-supporting frame and centrally located supporting elements to prevent buckling between the two filter elements. The frame includes two portions, the first of which portions extends adjacent the entire periphery of both layers. The second portion is centrally disposed between the two filter elements for purposes of preventing buckling. In both patents the filter layers contain thermoplastic materials which are secured relative to the support frame elements by heat sealing the filter layers to each other which undesirably compacts the filter material adjacent the frame. The filter elements disclosed in both patents have disadvantages in that first compacting by heat sealing reduces the effective filtering area. Secondly, because of the necessity of said heat sealing to achieve full support, the particular material in each layer must be thermoplastic.

SUMMARY

The internally supported composite frameless filter of the invention includes:
 a. at least two fluid permeable filter members having substantially the same peripheral shape;
 b. a thin wire-like frame member positioned between said filter members and spaced inwardly from the periphery thereof;
 c. the first of said filter members being the upstream filter layer and comprising a relatively thick, low density, medium or long filament puffed glass fiber layer;
 d. the second of said filter members being the downstream filtering layer and comprising a thin, relatively high density, non-woven, fibrous layer;
 e. anti-bulge means including localized compression means centrally positioned on both sides of the composite filter compressively sandwiching said filter members therebetween, said compression means being rigidly attached to each other through said filter members; and
 f. each of said filter members being adhesively secured to said frame member and being uncompacted throughout each of their entire thickness except in the area of said anti-bulge means.

The process of the invention for making frameless filters includes the steps of:
 a. coating lengths of wire stock with a hot melt adhesive and forming the thus coated wire length into frame members after the adhesive cools and solidifies;
 b. inserting the coated frame member from step (a) between the plies of a multi-ply fibrous filter blank;
 c. activating the adhesive on the frame member thereby adhesively securing the frame member to the plies of the filter bland; and
 d. compressively sandwiching the filter plies in a localized central area at the blank between compression means positioned on both sides of the blank and attached to each other through the blank.

DESCRIPTION OF THE DRAWING

The present invention will be more fully understood from the following description taken in conjunction with the accompanying drawing wherein:

FIG. 2b is a cross-sectional view taken along the line 2b—2b of FIG. 2a;

FIG. 3 is a flow diagram illustrating one way in which the process of the invention can be carried out.

DESCRIPTION

Figure 1:
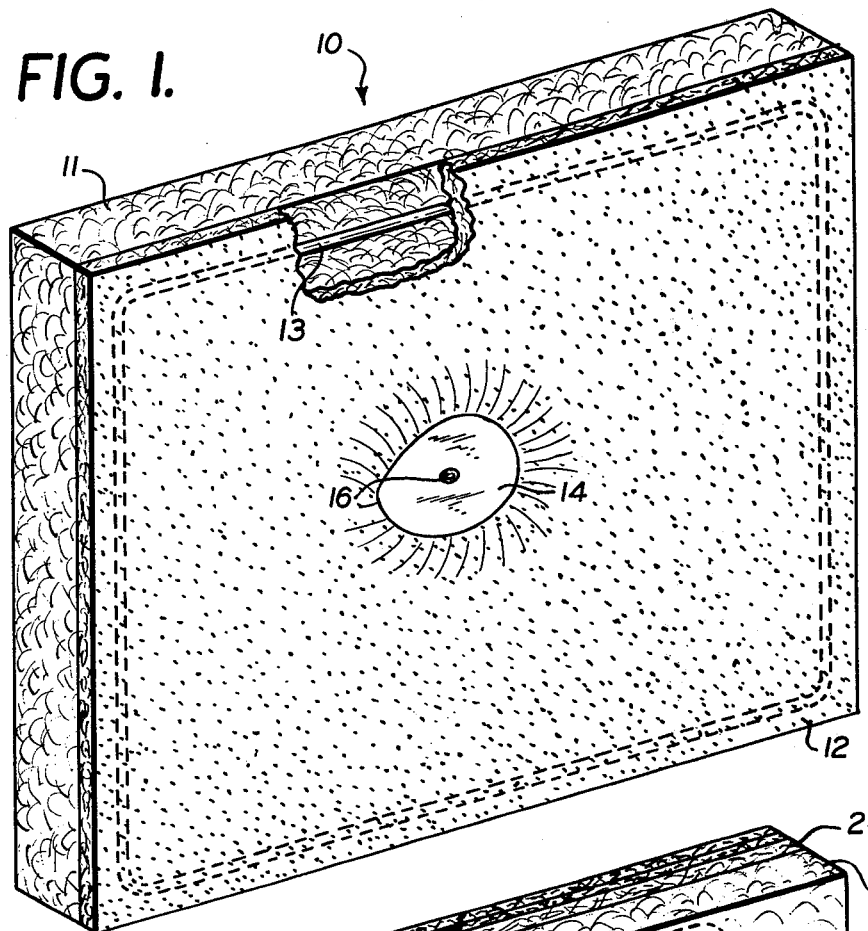
FIG. 1 is perspective view partly broken away of an internally supported composite filter according to the invention.

Frameless composite filters of the invention offer several advantages over conventional panel-type air filters. The filters of the invention provide greater air flow, higher efficiency and greater dust holding capacity. These improved qualities are combined to clean the air more efficiently and consequently save more energy.

Composite frameless filters of the invention include two filter layers different in density from each other. A preferred embodiment is an all fiberglass air filter of rectangular configuration, having two glass fiber layers. The frameless filters are made self-supporting by adhesion to a rigid internal metal wire ring or frame. An anti-bulge device includes two compression discs which are positioned at the geometric center of the composite filter. These two discs compressively sandwich the layers of the composite filter and are rigidly attached to each other through the filter members. The anti-bulge device co-operates with the rigid frame member adhesively secured to the plies of the filter in preventing bulging of the filter when air is forced to flow therethrough. The anti-bulge device provides a minimum reduction in filter area while attaining the necessary strength to resist bulging. No heat sealing or spot fusing is involved, making assembly relatively simple.

The filter members extend beyond the wire frame in a peripheral direction, making it possible to create a force-fit with a self-gasketing edge seal. This prevents unfiltered air bypass.

Another unique feature is the ability to compress the entire assembled composite filter for packing and shipping, something not possible with conventional exteriorly framed filters.

Additional unique features of the composite frameless filter of the invention include the following:

It is safer. No sharp bottle scrap metal grill facings are utilized which can cause finger lacerations on installation.

Claim damage problems are reduced and even eliminated. Because no exterior paperboard framing is utilized, there is no possibility of damage from crushing and/or wetting in storage or transit.

There is more air flow. Over 99% of the functional surface area is utilized for filtering with composite filters of the invention. Conventional panel filters provide less than 83%. The greater resulting air flow of composite filters of the invention reduces resistance while simultaneously increasing efficiency.

Positive filter seal. The sturdy wire frame or ring, preferably made of steel, is sized to conform to the face dimensions of standard filter cells. Since the frame support is internal, the peripheral portion of the filter layers extending beyond the wire frame seals the peripheral edges eliminating unfiltered leakage problems inherent in box-type air filters.

Space savings are realized. With no box-like framing to protect, the resilient composite filters can be compressed into shipping cartons of substantially reduced heitht. It is thus possible to store and transport more filters in considerably less space. For example, space savings will range between 25% for a one inch thick filters and 60% for 2 inch thick filters. Because of the completely resilient nature of the puffed glass layer of the composite filter, the filter regains its full filter thickness once it is removed from the storage carton.

The less dense, puffed glass layer of the composite filters is preferably color coded to designate the correct air flow direction. The porosity of this puffed glass layer is noticeably more open such that large particles will not surface load and clog the filter. The second more dense layer of the composite filter assures finer particle entrapment and greater depth filling capacity. The high resiliency of the puffed glass layer enables it to resist the compressing effect on an air stream. This resiliency extends the life of the filter because the underlying fibers do not mat into a "wall-like block" with superimposed fibers.

In a preferred embodiment the second or downstream fibrous layer is a rigid glass fiber layer with the filaments thereof predominantly oriented in the same general direction. This layer, because of its rigid nature, serves as a dimensionally reinforcing laminate for fine particle retention.

Referring to the drawing, FIG. 1 shows a rectangular shaped internally supported dual filter element 10 of the present invention. More specifically, the figure demonstrates filter member 11 having a layer of relatively thick low density glass fiber material, filter member 12 comprising a relatively thin layer of high density fibrous material, and a wire-like support frame 13 disposed between the two layers as shown in the cut-away and by the dotted lines. Each of the layers is adhesively connected to the frame 13 whereby the layers interface with one another and are uncompacted throughout each of their entire thickness except in the central area of the anti-bulge device as described herein.

As mentioned above, wire-like frame member 13 is positioned between layers 11 and 12 for internal support. The frame 13 comprises a rectilinear portion spaced inwardly from the periphery of the rectangular filter 10 and a central wire-like bracing portion connected to opposite sides of the rectilinear portion. The rectilinear portion of the frame 13 being spaced inwardly from the perimeter of the filter 10 forms a margin about its edge for gasketting means in a filter housing.

As shown in FIG. 2, a preferred composite filter 20 includes a low density puffed glass fiber layer 28, two relatively rigid high density layers 22 and 24 adhesively secured to each other and an intermediate layer 26 between layers 24 and 28, having a density intermediate the density of layers 22, 24. The layers 24 and 28 are adhesively secured to either side of the intermediate density layer 24. In this embodiment the frame member 13 is adhesively secured via hot melt adhesive 15 to the rigid interfacing layers 22 and 24.

In the embodiment of FIG. 1 the second filter member 12 is preferably other than glass fiber, while the first filter member 11 is a high density puffed glass fiber layer. Layer 12, for example, can be polyester layer. In FIG. 2, the layers 22 and 24 are preferably a relatively rigid, medium or long filament glass fiber layer with the filaments thereof predominantly oriented in the same general direction. Thus in this embodiment the so-called second filter member is made up of two rigid glass fiber layers 22 and 24 with the frame member 13 positioned between these layer and adhesively secured thereto.

The anti-bulge device used in the composite frameless filters of the invention eliminates the need for bracing members such as used in the aforementioned Nash patents, which bracing members are directly attached to or tied into the peripheral frame 13. As best shown in FIG. 2b the anti-bulge device includes two compression discs 14 which are centrally positioned on both sides of the composite filter. The two discs 14 compressively sandwich layers 26 and 28 with layers 22 and 24. The compression discs 14 are rigidly attached to each other through the filter members, for example by means of rivot 16. In the preferred embodiment illustrated in FIG. 2b, the anti-bulge device compresses the low density puffed glass layer 28 down to the rigid glass fiber layers 22 and 24 which layers remain substantially in the same plane as the frame member 13. This provides a desired stiffening effect for the entire composite filter and takes advantage of the rigid nature of the dense layers 22 and 24.

Figure 2A:
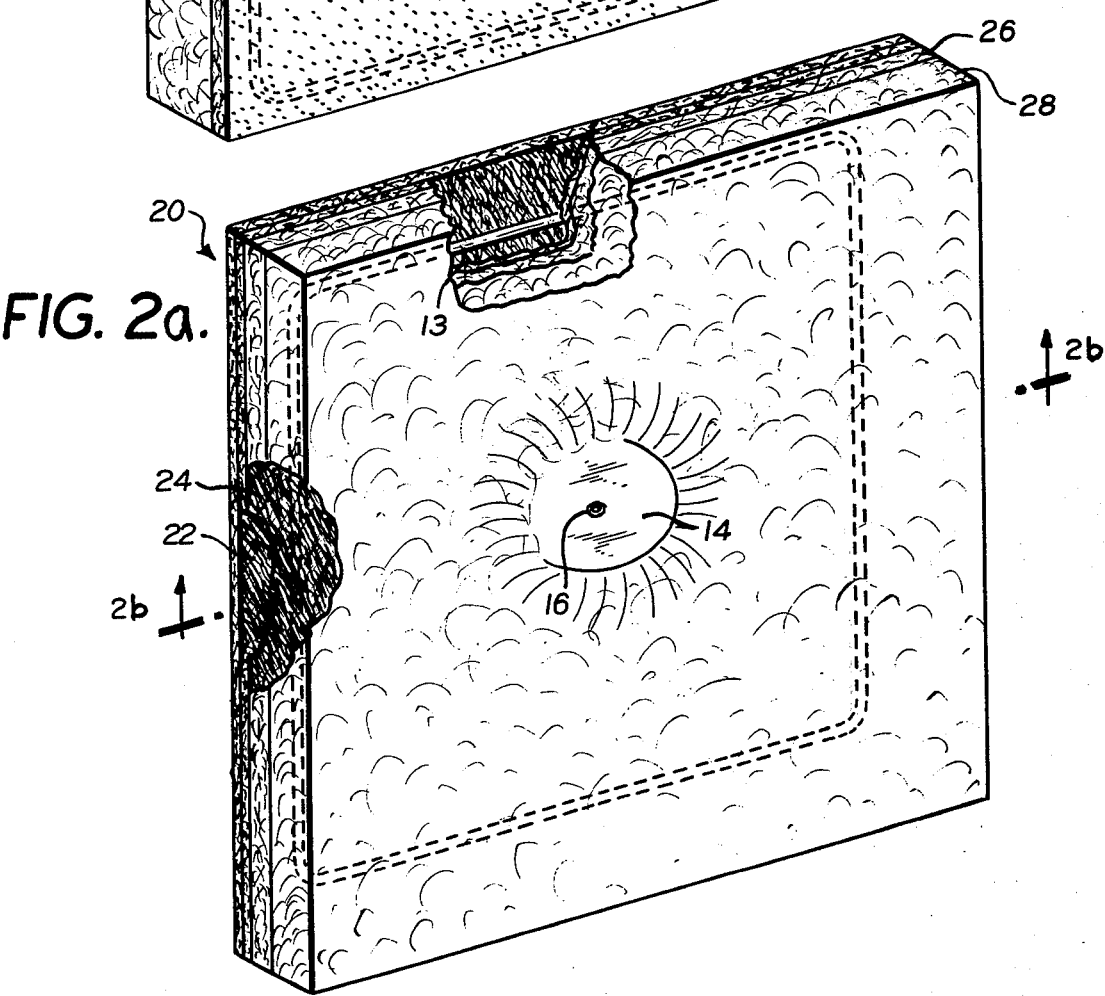
FIG. 2a is a perspective view also partly broken away illustrating another embodiment of the internally supported composite filter of the invention.

As shown in FIG. 2a, the two rigid layers 22 and 24 each have filaments predominantly oriented in the same general direction and the orientation of both layers is generally the same with respect to each other.

In the operation of the filter device of FIG. 1 air to be filtered passes from the less dense thick glass fiber layer 11 to thin layer 12 of greater fiber density. In this way the air entering layer 11 traps larger particles of dirt without clogging the filter so that the second ply layer 12, with greater fiber density, can catch and retain smaller particles. For this reason, layer 10 can be termed the "up-stream filtering" layer and layer 11 the "downstream filtering" layer.

As heretobefore mentioned, both filter members are adhesively secured to wire-like frame member 13. This is generally accomplished by coating the frame with a suitable adhesive and connecting the layers thereto. Any adhesive which effectively wets both the surfaces of the filter material may be used. Exemplary of suitable adhesive substances are polymeric materials having negligible water solubility which averts its removal by water in the air. Preferred materials are rubber containing adhesive such as latex. A preferred embodiment of the invention is a process involving the use of a hot melt adhesive as described herein.

Upstream thick layers 12 and 28 may comprise any high loft, low density glass fiber filter material. One of the advantages of the present dual layered filter is that air entering layer 12 being of glass fiber will not lose its loft when compressed. A preferable filter material or medium is long filament puffed glass fiber. One particular material which can be used in the instant composite filter is a puffed glass fiber filter medium sold under the trademark DRICO. Thicknesses of the upstream layer should be at least 55% of the total thickness of the filter element due to its capacity to trap large residue particles. Composite filters having an upstream layer of 55% and above of the total thickness allow the filter to be useful in a multiplicity of fluid systems, i.e., both lower and higher velocity systems. Preferable thicknesses range from 85 to 95% of the total thickness of the filter device.

The materials which can be used in the downstream thin layer 12 may be any material having a relatively high fiber density to render it capable of trapping dust and other microscopic particles found in air and pervious to upstream thick layer 11. Preferably high density fibrous materials include non-woven synthetic fabrics such as non-woven polyesters. Such non-woven fabrics may be bonded with a fire retardant resin or other suitable bonding agent. The downstream filter face of layer 11 or either face of layer 12 can be impregnated with a viscous oily additive to improve mechanical filtration. Typical of such oily additives include water insoluble polymeric hydrocarbons or plasticizers such as tricresyl phosphate. The downstream thin filter layer 12 of the instant invention is capable of filtering very fine solid particulate matter entrained in a fluid.

Downstream rigid layers, such as layers 22 and 24 shown in the preferred embodiment of FIG. 2 is preferably a relatively rigid medium or long filament glass fiber layer with the filaments thereof predominantly oriented in the same general direction. This particular fibrous layer is also thin and relatively high in density as compared to the upstream layers 12 and 28. The preferred intermediate layer 26 having a density intermediate that of upstream layers 12 and 28 and downstream rigid layer 22 can also be made of a medium or long filament fiberglass material.

The frame 13 may be made of various rigid materials such as metal, plastic, etc. The frame may be of any construction which renders the filter self-supporting as long as the frame does not interfere with the flow of air. In addition, the frame should be within the periphery of the dual layered structure so as to form a flexible outer margin of the two layers. This insures a gasket fix when the filter element is force fit into a housing device. Within the purview of the present invention the frame member should be located at least about three-eighths of an inch from the periphery of the two layers.

Referring now to FIG. 3 of the drawing, the preferred process of the invention for making internally self-supported composite frameless filters includes the steps of coating lengths of wire stock with a hot melt adhesive and forming the thus coated wire lengths into frame members after the adhesive cools and solidifies. The coated frame member is then inserted between the plies of a multi-ply fibrous filter blank and the adhesive is thereafter activated to adhesively secure the frame member to the plies of the filter blank. Then the filter plies are compressively sandwiched to a localized central area of the blank between compression discs positioned on both sides of the blank and attached to each other through the blank. It should be understood that the several steps of the process of the invention need not be carried out in the sequence indicated. For example, the anti-bulge device can be applied to a filter blank before the coated frame member is inserted between the plies thereof. It is also possible to continuously coat wire stock with a hot melt adhesive, the stock subsequently being cut into the desired lengths and formed into a frame member. Conversely, wire stock can be cut into lengths, formed into a frame member and then coated with a hot melt adhesive.

It is preferred, however, to first coat wire stock or lengths or wire with a hot melt adhesive by passing the wire through a hot die which radially injects or extrudes a hot melt adhesive into the wire. The wire lengths are then cooled to solidify the adhesive and are bent into the form of a frame using conventional bending jigs. The frame is then completed by spot welding and prior thereto, the adhesive should be stripped off the ends of the wire frame to be spot welded. It is also possible using control measures to interrupt or stop the application of hot melt adhesive to the wire lengths such that the ends thereof will not be coated with adhesive.

The coated frame member is then positioned between the plies of a multi-ply glass fiber filter blank and is spaced inwardly around the periphery of the filter blank. See FIGS. 1 and 2 of the drawing.

In order to adhesively secure the plies of the filter blank to the frame member, the hot melt adhesive coating on the frame member has to be reactivated through the input of sufficient heat. This can be accomplished by simply exposing the filter blanks with the frame members in place to heated air or another heat source sufficient to soften the hot melt adhesive and form an adhesive bond with the adjacent fibers of the plies of the filter blank. The preferred hot melt adhesive is a polypropylene based material.

However, it is preferred to stack up filter blanks with the unactivated adhesively coated frame members in place and then pass this stack of composite filters through a high frequency induction heating zone which quickly and efficiently induces sufficient heat so as to activate the adhesive and form the desired adhesive bond between the frame and the adjacent plies of the filter blank. High frequency induction heating devices are known and can be used as modified herein.

The finished filters can then be packaged (with compression to save space) and shipped for eventual use.

Additionally, the instant composite filter may comprise a handling element such as a pull tab attached to the frame 3 or a small extension or appendage to downstream layer 12. One example of such handling element is a vinyl or aluminum strap tab. The pull tab facilitates the removal of the filter from a housing in which it is well set without the necessity of handling the filter surfaces. This handling element is of particular utility when the filter has been used resulting in the large accumulation of dirt on the filter surfaces.

Figure 4:
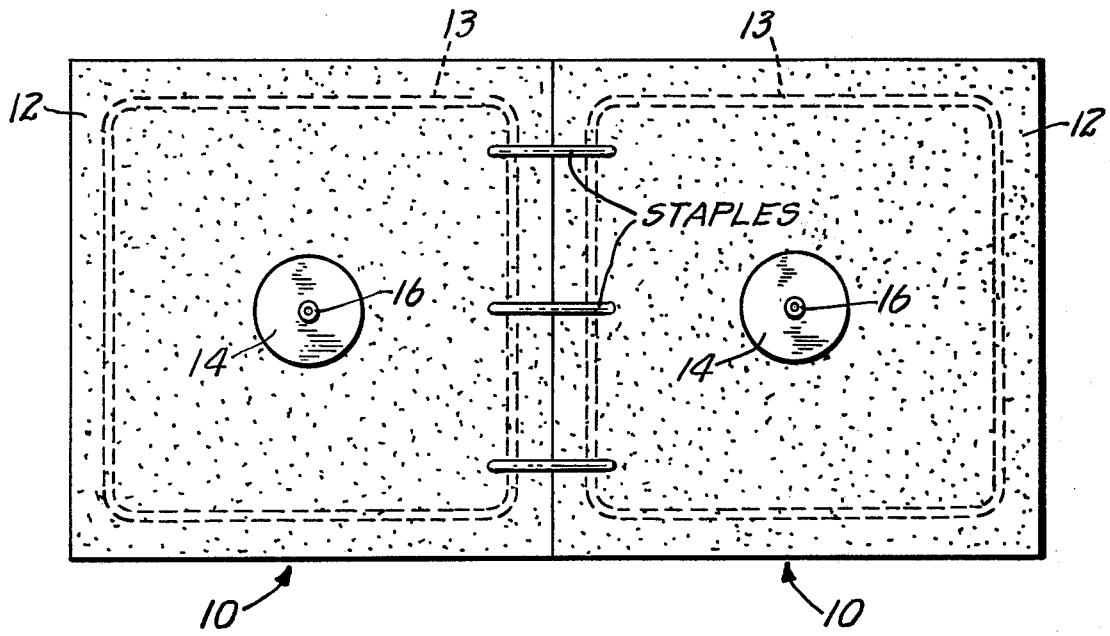
FIG. 4 is a top plan view showing filters according to the invention in side-by-side alignment.
Figure 5:
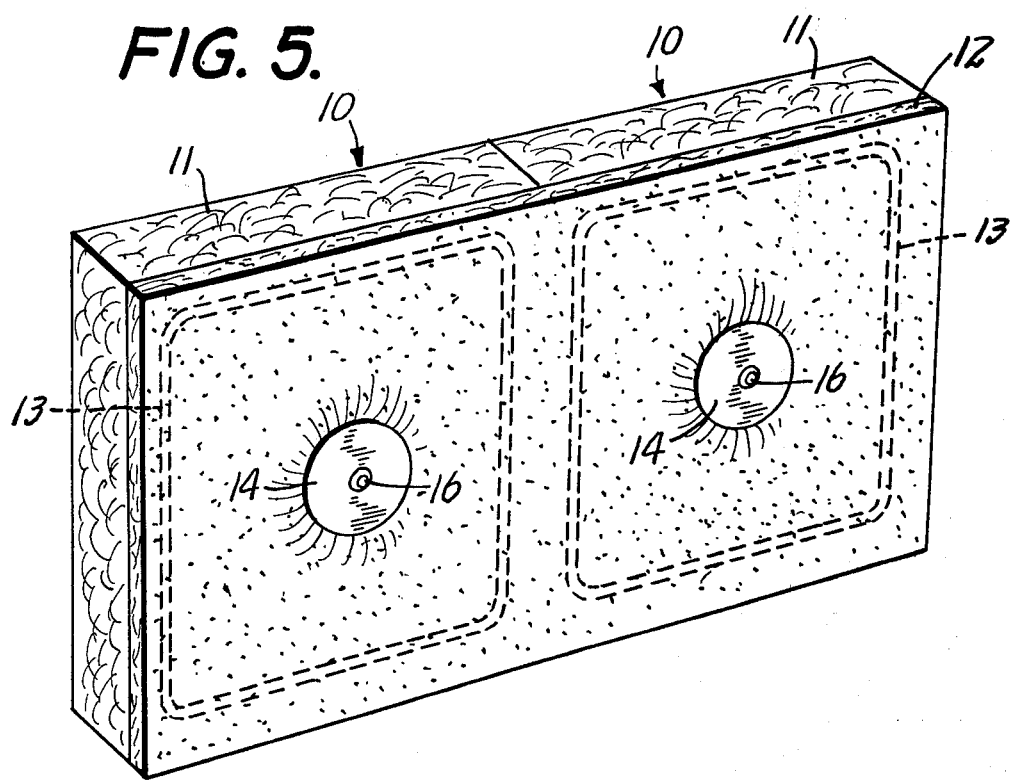
FIG. 5 is a perspective view of a further embodiment showing filters according to the invention in side-by-side alignment.

It is within the purview of the present invention that a plurality of the instant composite filters may be used in combination in a multiple filter housing unit. Therefore, the composite filters may be used edge to edge within a slide in filter bank, that is, in side by side alignment. In order to facilitate removal of the filter from the bank, it is preferable to secure adjacent wire frame elements 13 together (for example by stapling) as shown in FIG. 4 or to use a strip of layer 12 or layer 22 which is common to two or more upstream layers 11 or 28 (FIG.5). Therefore, a continuous strip of downstream filter material 12 or 22 can be used to form a line of edge to edge composite filters having an integral strip of downstream material extending throughout the slide in filter bank area as shown in FIG. 5. By these means not only is air bypass between the composite filter media prevented but also removal from inaccessible areas of the slide in filter bank is facilitated.

What is claimed is:

1. Internally supported composite frameless filter comprising:
   a. at least two fluid permeable filter members having substantially the same peripheral shape;
   b. a thin wire-like frame member positioned between said filter members and spaced inwardly from the periphery thereof;
   c. the first of said filter members being the upstream filter layer and comprising a relatively thick, low density, medium to long filament puffed glass fiber layer;
   d. the second of said filter members being the downsteam filtering layer and comprising a thin, relatively high density, non-woven, fibrous layer;
   e. anti-bulge means including localized compression means centrally positioned on both sides of the composite filter compressively sandwiching said filter members therebetween, said compression means being rigidly attached to each other through said filter members; and
   f. each of said filter members being adhesively secured to said frame member and being uncompacted throughout each of their entire thicknesses except in the area of said anti-bulge means.

2. Composite filter of claim 1 wherein said second filter member is other than glass fiber.

3. Composite filter of claim 1 wherein the glass fiber layer comprises at least about 55% of the overall thickness of the composite filter.

4. Composite filter of claim 1 wherein said glass fiber layer comprises from about 85 to about 95% of the overall thickness of the composite filter.

5. Composite filter of claim 1 wherein said filter members are adhesively secured to said frame member by a hot melt adhesive coated on the said frame member.

6. Composite filter of claim 1 wherein said second filter member is a fibrous polyester layer.

7. Composite filter of claim 1 wherein said second fibrous layer is sufficiently dense to trap very fine particulate solid matter, entrained in a fluid flowing through said layer.

8. Composite filter of claim 1 wherein said frame member is spaced about three-eighths of an inch in from the periphery of said filter members.

9. Composite filter of claim 1 wherein said second filter member is a relatively rigid medium or long filament glass fiber layer with the filaments thereof predominately oriented in the same general direction.

10. Composite filter of claim 1 wherein the anti-bulge means compresses the puffed glass layer down to the rigid glass fiber layer which remains substantially in the same plane as the frame member.

11. Composite filter of claim 1 wherein said second filter member is made up of two of said rigid glass fiber layers with said frame member positioned therebetween and adhesively, secured thereto, said first filter member being adhesively attached to said second filter member.

12. Composite filter of claim 1 wherein a third filter member is positioned between said filter members, said third filter member having a density intermediate the density of said first and second filter members.

13. Internally supported composite frameless filter comprising at least two composite filters of claim 1 in side by side alignment wherein the second filter member is integral and common to individual, adjacent first filter elements.

14. Internally supported composite frameless filter comprising at least two composite filters of claim 1 in side by side alignment wherein the wire-like frame members of adjacent composite filters are interconnected with one another.

* * * * *